United States Patent [19]

Tildesley

[11] Patent Number: 4,842,462

[45] Date of Patent: Jun. 27, 1989

[54] DIECAST SCREWTHREADED INSERTS AND METHOD OF MAKING THEM

[75] Inventor: James M. G. Tildesley, Shropshire, United Kingdom

[73] Assignee: P.S.M. Fasteners Limited, Willenhall, England

[21] Appl. No.: 233,883

[22] Filed: Aug. 15, 1988

Related U.S. Application Data

[63] Continuation of Ser. No. 11,390, Feb. 5, 1987, abandoned, which is a continuation of Ser. No. 780,644, Sep. 26, 1985, abandoned.

[30] Foreign Application Priority Data

Nov. 15, 1984 [GB] United Kingdom ............... 8428862

[51] Int. Cl.$^4$ ................... F16B 37/04; F16B 39/02
[52] U.S. Cl. .................................... 411/180; 411/82; 249/59
[58] Field of Search ................ 411/82, 179, 180, 968; 10/86 R; 249/59; 52/704, 705

[56] References Cited

U.S. PATENT DOCUMENTS

| | | | |
|---|---|---|---|
| D. 262,863 | 2/1982 | Barnsdale | 411/180 |
| 3,112,540 | 12/1963 | Kaneko et al. | 249/59 |
| 3,405,591 | 10/1968 | Neuschotz | 411/178 |
| 3,530,921 | 9/1970 | Ernest | 411/968 |
| 3,834,438 | 9/1974 | Ziaylek, Jr. | 411/968 |

FOREIGN PATENT DOCUMENTS

| | | | |
|---|---|---|---|
| 2917934 | 11/1980 | Fed. Rep. of Germany | 411/180 |
| 2461142 | 3/1981 | France | 411/180 |
| 782952 | 11/1980 | U.S.S.R. | 249/59 |
| 1279452 | 7/1969 | United Kingdom . | |
| 2039660 | 12/1979 | United Kingdom . | |

OTHER PUBLICATIONS

"GRC" Die Cast Industrial Fasteners and Molded Nylon Fasteners, Gries Reproducer Corp., 125, Beechwood Ave., New Rochelle, N.Y.

Primary Examiner—Neill R. Wilson
Attorney, Agent, or Firm—Sheldon & Mak

[57] ABSTRACT

A screwthreaded insert comprises a series of generally cylindrical body portions provided with inclined ribs or teeth, with the teeth of one portion extending in the opposite direction to those of the next adjacent portion, and the successive toothed portions being separated by grooves. The fastener is made by diecasting, and a pair of flats is formed on opposite sides of a diameter of the body.

19 Claims, 2 Drawing Sheets

DIECAST SCREWTHREADED INSERTS AND METHOD OF MAKING THEM

This application is a continuation of application Ser. No. 011,390, filed 2/5/87, now abandoned, which itself is a continuation of application Ser. No. 780,644, filed Sept. 26, 1985, now abandoned.

This invention relates to screw-threaded inserts intended for installation in bodies of thermoplastics material by any of various techniques.

BP No. 1279452A shows a fastener for ultrasonic installation, which is generally cylindrical having three portions of successively larger diameter, with intervening plain grooves of a common smaller diameter. The second and third of the large diameter portions are provided with ribs or teeth extending helically, and the two toothed or ribbed portions are of opposite hand. That is to say, viewed from one end of the fastener, one portion has the helices extending clockwise in travel along the length of the fastener in one direction, whereas the other portion has the helices extending anti-clockwise in travel along the fastener in the same direction. When the fastener is embedded in the plastics material, the surrounding material substantially fills the spaces between the teeth and also the grooves along the length of the body. The material in the grooves provides resistance to pull-out but no resistance to turning, and the opposite hand of the two sets of teeth provide the resistance to turning. For example, if both sets were to be made of the same hand, they would act like a screwthread and a turning load in the appropriate direction would tend to unscrew the insert from the plastics body.

Whilst the said BP No. 1279452-A describes the ultrasonic installation, using high frequency vibrations to cause the plastics to "flow", GB No.2039660B describes a fastener having ribbed portions of opposite hand at different axial locations, which is suitable for installation in appropriate materials by local heating to cause the plastics to flow.

FP No. 7918524 discloses a fastener for insertion into plastics material provided with a flat face formed on the periphery of the component, for example by a cutting operation, so as to provide an extra resistance against rotation.

These fasteners must be made on automatic lathes from bar stock at very high speeds in order to be economically acceptable, but because of the number of separate operations, what is now seen to be high production cost is inevitable, although in fact the cost has been accepted in the past. But forming the flat to give the additional anti-rotational hold as in the mentioned French Patent cannot be done on the automatic lathe and requires a separate operation which is even more expensive to produce.

The object of the present invention is to provide an improved design of fastener which is capable of production at only a fraction of the production cost.

In accordance with the invention a fastener is made by die-casting material in liquid form to create a series of successive body portions of different transverse widths of which at least one is provided with ribs or teeth or and with a pair of generally diameterically related substantially planar surfaces extending generally along the length of the fastener, said fastener having a screw-threaded portion.

It is within the scope of the invention, at one extreme, to make a fastener where all of the body portions are of circular cross-section apart from the flat surfaces: that is to say the toothed body or bodies may have a cross-sectional shape defined by two mouth-to-mouth arcs of the same radius on a single centre of curvature, ends of the arcs being joined by parallel secants of a circle.

The ribs may be helically extending, and two successive portions may have helices of opposite hand, but it is within the scope of the invention to use axially extending ribs, circumferentially extending ribs, or e.g. knurled teeth arranged in any desired pattern.

At the other extreme, the bodies may be of triangular cross-section. Any intermediate shape may be employed such as square, polygonal or a shape defined by a series of curves of larger radius than half the maximum width.

These possibilities occur because the two constraints on design which usually limit the fastener manufacture are removed: the fastener is not to be manufactured on a lathe, nor inserted by a rotary motion.

The die-casting is effected in die cavities which meet at a diametric plane of the fastener, and the flats are inter-sected by said plane. Preferably they are bi-sected.

Die-casting per se can provide far greater production rates, because it eliminates the steps necessary in machining bar, of producing the various different diameters from the bar and forming the teeth or ribs. The teeth or ribs and the different diameter portions are formed by the dimensions of the die cavity.

However, it has been found impossible to produce a fastener according to either of said previous Patents as shown in the drawings of said Patents by die-casting.

Fasteners of the kind in question are as mentioned provided with a screwthreaded portion. This may be internally provided, so as to make an insert nut, or externally provided so as to make an insert stud. It is preferred to cut the screwthread in a subsequent operation. The flats provided by the invention provide a convenient gripping surface while the screw cutting is carried out.

Additionally, the fastener of the invention may optionally be provided with a non-circular head further to facilitate gripping during screwthread forming.

Another surprising advantage of the present invention, over and above the increased production rates which are possible and greatly reduced costs which then occur, is that it offers greater flexibility in design of the shape and position of the ribs and teeth as well as of the body shape as previously discussed. When those ribs or teeth are to be produced by a knurling operation, a symmetrical rib which is moreover generally located at 45° to the axis of the fastener is most easily produced. Since the teeth of the die-cast fastener are only produced once (on the original mould for example by a spark erosion operation) instead of on each fastener there is no limit in this direction. It is therefore possible and is preferred to provide an assymmetric tooth or rib of which the cross-section has a steeper flank, nearer to the plane normal to the axis of the fastener, towards the end of the fastener which lies on the surface of the material when the fastener is installed, and a gently inclined flank, in other words one at a relatively great angle to the said plane directed towards the pilot end of the fastener which is first inserted into the material. By these means, the fastener can provide a greatly improved pull-out load because the teeth can contribute much more to this as well as, and without detracting from, the anti-rotational hold provided by the teeth. Insertion is also simplified by this. Hence, surprisingly, a technically improved fastener can be produced more rapidly and at a fraction of the original cost of the fastener shown in said prior Patents.

The foregoing discussion of asymmetry assumes that the fastener is single-ended. It may then comprise two or more two ribbed portions of successively greater diameter towards the head end which is to lie on the surface of the article in which the fastener is installed. Where the fastener is to be double-ended, so that it is immaterial which end is inserted and the fastener is symmetrical about a mid-point along its length, the toothed or ribbed portion may be of uniform diameter and then it is preferred to employ a symmetrical tooth-/rib profile.

The invention is more particularly described with reference to the accompanying drawing wherein.

Figure 1:
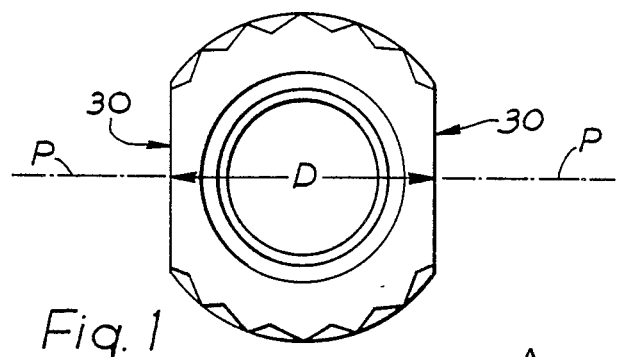
FIG. 1 is a plan view of a fastener made according to the present invention.
Figure 2:
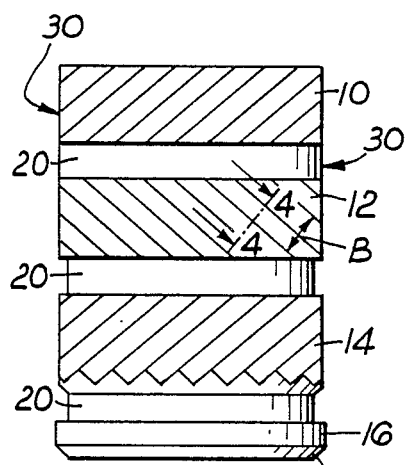
FIG. 2 is an elevation of the same.

It is observed that fasteners of this kind are normally made of the order of 5 or 10 mm diameter overall, and say 7 mm–15 mm in length, which small size aggravates the problems of providing accurate shapes and contours of different parts in mass production. It is also observed that the drawings are many times full size.

Referring to the drawings, the fastener comprises a body with a largest diameter generally cylindrical portion 10, a slightly smaller diameter generally cylindrical portion 12, a third and again smaller diameter cylindrical portion 14 and a pilot portion, also generally cylindrical indicated by the reference numeral 16 which is slightly smaller in diameter than the portion 14. The pilot portion is bevelled at the leading end at 18.

The successive parts 10, 12, 14, 16 are separated by relatively narrow flat bottom grooves 20 all of which may be of the same diameter.

Figure 4:
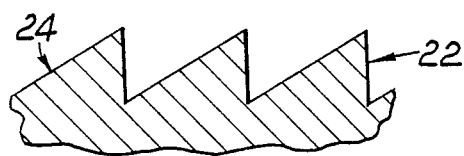
FIG. 4 is a cross-section taken on the line 4—4 on a greatly increased scale.
Figure 5:
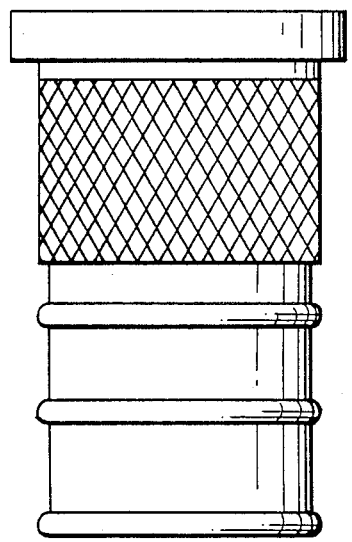
FIG. 5 is a view similar to FIG. 2 of a modified fastener.
Figure 6:
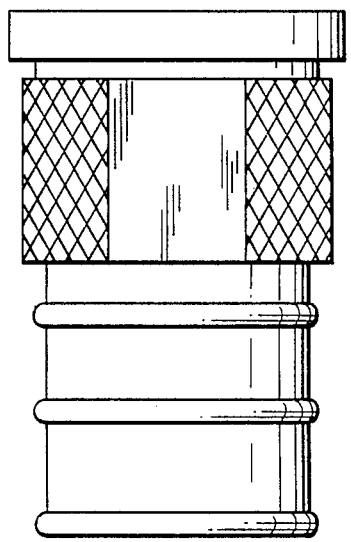
FIG. 6 is a view similar to FIG. 3 of the modified fastener.

The portions 10, 12 and 14 are provided with generally helically extending ribs shown in cross-section in FIG. 4 and, as previously explained, these may not be symmetrical. As here illustrated the upper flank 22 most closely adjacent the end 10 is steep and lies at only a slight angle to that of a plane normal to the axis of the complete fastener whereas the opposing flank 24 is relatively gently inclined, all for the purpose of improving the insertion and the pull-out load applied for example in the direction of the arrow A when the fastener is installed with the end 10 flush with the surface of the article.

The helix angle B is preferably less than 45° to a plane normal to the axis for the purpose of increasing the anti-rotational hold. The helix angle of the teeth on the portions10, 12 and 14 may be equal, but of course different since the portions are of different hands.

Figure 3:
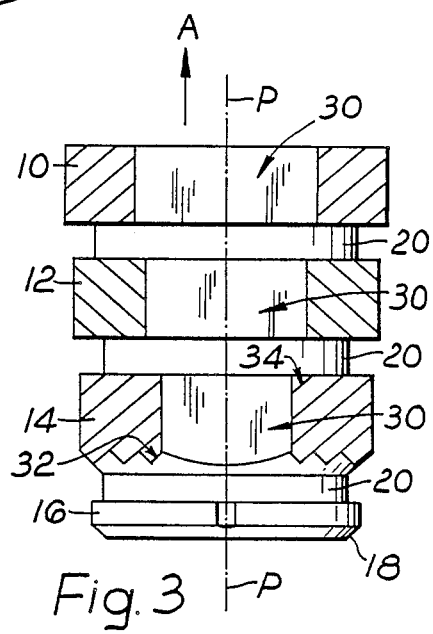
FIG. 3 is an elevation taken at right angles to the elevation of FIG. 2.

As best seen in FIGS. 1 and 3 a pair of diametrically related flats 30 is provided. The diameter D (FIG. 1) between the flats may be the same (within overlapping manufacturing tolerances) as the cylindrical diameter of the portions 20, in which case it will be appreciated that there are separate flats provided on each of the portions 12 and 14 but not on the portions 20.

However, if the portions 20 are of different diameters along the length of the fastener, as may be the case, there may be flats on the portions 20. A typical case is shown in the drawings.

As previously explained, this fastener is to be manufactured by die-casting by injecting molten material, most usually metal, preferably as a pressure die-casting rather than a gravity die-casting, into an appropriate die cavity which may be formed between a pair of die parts meeting at a plane indicated by the chain dot line P FIG. 1 and 3. The plane bi-sects the flats.

This means that in removal of material from a block to form a die cavity corresponding to one half of the fastener, the grooves which are to form the helical ribs run out short of the face of that block which is to form the mating face with another similar block forming the other half the die cavity, and in production, the other half of the fastener. This greatly simplifies die production and in particular it means that the root or crest 32 (FIG. 3) of one rib on one side of the flat needs only to be generally and not precisely aligned with the like root or crest 34 on the opposite side of the same flat. In one modification, not shown, end portion 10 has an added hexagonal head of larger diameter across the flats than the body across its flats, or of the same across-flats dimension. In another modification not shown, the hexagon head is used instead of portion 10 and the groove 20 between the head and portion 12 is omitted: that is to say there are only two ribbed or toothed portions.

The drawings do not show the screwthread portion which the fastener is to be provided with, either as a nut or stud as mentioned. However, the fastener made by the die-casting method as shown in the drawings is to be gripped by the flats and/or by the hexagon head (if provided) to be operated on by a tapping or threading machine. The die-casting will provide a hole to be screw-tapped, or a stud to be screw-threaded.

In another modification, not shown, the head 10 is omitted. In another modification, not shown, portions 12, 14 are of equal diameter. In a third modification, not shown, the fastener is double-ended, that is to say it has pilot portions 16 at each end and no head and both ribbed portions of the same diameter.

Knurling, particularly to provide generally frusto-pyramidal teeth may be employed instead of ribs on some or all of the portions. As mentioned, the rib angle (where ribs are used) or the knurl angle is variable between 0% and 90% to the fastener axis.

I claim:

1. A diecast fastener suitable for being installed in an installation material and having a longitudinal axis comprising:
   (a) a body portion having first and second sections, the first section being substantially diametrically opposite to the second section on the fastener, the first section having helically-oriented ribs oriented against one direction of rotation of the fastener and the second section having helically-oriented ribs oriented against the opposite direction of rotation of the fastener, the body portion further having first and second flats defining first and second planes, the first and second sections being separated by the first and second flats on the fastener, the ribs not extending from the fastener beyond the first and second planes; and (b) a pilot portion of lesser diameter in cross-section than the body portion, the pilot portion being located at one end of the fastener for guiding the fastener into the installation material.

2. The diecast fastener or claim 1 further comprising a bottom groove of lesser diameter in cross-section than at least a portion of the pilot portion, the bottom groove being disposed between the pilot portion and the body portion so that the pilot portion tends to prevent the fastener from being pulled out of the installation material in a direction parallel to the longitudinal axis of the fastener.

3. The diecast fastener or claim 1 comprising a plurality of body portions.

4. The diecast fastener of claim 1 comprising a plurality of body portions, two of the body portions having different diameters in cross-section.

5. The diecast fastener of claim 1 wherein the ribs have resisting plane surfaces inclined toward an end of the fastener opposite the pilot portion, the resisting plane surfaces being substantially perpendicular to the longitudinal axis of the fastener so as to tend to prevent the fastener from being pulled out of the installation material.

6. The diecast fastener of claim 1 wherein the ribs have facilitating plane surfaces inclined toward an end of the fastener having the pilot portion, the facilitating plane surfaces being at a relatively small angle to the longitudinal axis of the fastener so that the installation of the fastener is facilitated.

7. The diecast fastener of claim 1 further including a screw-threaded portion for attaching objects to the fastener when the fastener is installed.

8. The diecast fastener of claim 7 wherein the screw-threaded portion is inside the fastener.

9. The diecast fastener of claim 7 wherein the screw-threaded portion extends from and is outside the fastener.

10. The diecast fastener of claim 1 wherein helical orientation of the ribs is at a 45 degree angle to a plane normal to the longitudinal axis of the fastener.

11. The diecast fastener of claim 1 wherein the ribs are knurled.

12. The diecast fastener of claim 1 wherein the ribs of the first section and the ribs of the second section are oriented against both directions of rotation.

13. The diecast fastener of claim 12 wherein the ribs of the first and second sections are cross-knurled.

14. The diecast fastener of claim 1 wherein the fastener is from 5 to 10 millimeters in diameter and from 7 to 10 millimeters in length.

15. The diecast fastener of claim 1 wherein the body portion has cross-sections substantially consisting of two arcs of the same radius joined by substantially parallel secants on a single center of curvature.

16. The diecast fastener of claim 3 further comprising a plurality of bottom grooves, of lesser diameter in cross-section than the body portions, disposed between the body portions.

17. A diecast fastener suitable for being installed in an installation material and having a longitudinal axis comprising:
(a) a first body portion having first and second sections, the first section being substantially diametrically opposite to the second section on the fastener, the first and second sections having helically-oriented ribs oriented against a first direction of rotaton of the fastener, the first body portion further having first and second flats defining first and second planes, the first and second sections being separated by the first and second flats on the fastener, the ribs of the first and second sections not extending from the fastener beyond the first and second planes;
(b) a second body portion having third and fourth sections, the third section being substantially opposite to the fourth section on the fastener, the third and fourth sections having helically-oriented ribs oriented against a second direction of rotation opposite to the first direction of rotation, the second body portion further having third and fourth flats defining third and fourth planes, the third and fourth sections being separated by the third and fourth flats on the fastener, the ribs of the third and fourth sections not extending from the fastener beyond the third and fourth planes; and
(c) a pilot portion of lesser diameter in cross-section than the body portions, the pilot portion being located at one end of the fastener for guiding the fastener into the installation material.

18. The diecast fastener of claim 15 further comprising a bottom groove of lesser diameter in cross-section than the pilot portion, the bottom groove being disposed between the pilot portion and the body portions so that the pilot portion tends to prevent the fastener from being pulled out of the installation material in a direction parallel to the longitudinal axis of the fastener.

19. The diecast fastener of claim 15 further including at least one additional body portion.

* * * * *